United States Patent
Birke et al.

(10) Patent No.: US 10,540,285 B2
(45) Date of Patent: *Jan. 21, 2020

(54) COORDINATION OF CACHE AND MEMORY RESERVATION

(71) Applicant: INTERNATIONAL BUSINESS MACHINES CORPORATION, Armonk, NY (US)

(72) Inventors: Robert Birke, Kilchberg (CH); Yiyu Chen, Thalwil (CH); Navaneeth Rameshan, Adliswil (CH); Martin Schmatz, Rueschlikon (CH)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/390,307

(22) Filed: Apr. 22, 2019

(65) Prior Publication Data
US 2019/0243762 A1 Aug. 8, 2019

Related U.S. Application Data

(63) Continuation of application No. 15/647,301, filed on Jul. 12, 2017, now Pat. No. 10,318,425.

(51) Int. Cl.
*G06F 12/0831* (2016.01)
*G06F 12/0804* (2016.01)
(Continued)

(52) U.S. Cl.
CPC ...... *G06F 12/0831* (2013.01); *G06F 9/45533* (2013.01); *G06F 11/34* (2013.01);
(Continued)

(58) Field of Classification Search
None
See application file for complete search history.

(56) References Cited

U.S. PATENT DOCUMENTS

| 6,865,647 B2 | 3/2005 | Olarig |
| 8,314,807 B2 | 11/2012 | Biswas |
| (Continued) | | |

OTHER PUBLICATIONS

Birke, et al., "Coordination of Cache and Memory Reservation", U.S. Appl. No. 16/390,334, filed Apr. 22, 2019.
(Continued)

*Primary Examiner* — Charles J Choi
(74) *Attorney, Agent, or Firm* — Michael A. Petrocelli (57) ABSTRACT

A method for coordinating cache and memory reservation in a computerized system includes identifying at least one running application, recognizing the at least one application as a latency-critical application, monitoring information associated with a current cache access rate and a required memory bandwidth of the at least one application, allocating a cache partition, a size of the cache partition corresponds to the cache access rate and the required memory bandwidth of the at least one application, defining a threshold value including a number of cache misses per time unit, determining a reduction of cache misses per time unit, in response to the reduction of cache misses per time unit being above the threshold value, retaining the cache partition, assigning a priority of scheduling memory request including a medium priority level, and assigning a memory channel to the at least one application to avoid memory channel contention.

1 Claim, 8 Drawing Sheets

(51) Int. Cl.

| | |
|---|---|
| *G06F 12/0877* | (2016.01) |
| *G06F 12/0873* | (2016.01) |
| *G06F 12/0871* | (2016.01) |
| *G06F 12/0868* | (2016.01) |
| *G06F 12/0842* | (2016.01) |
| *G06F 11/34* | (2006.01) |
| *G06F 9/455* | (2018.01) |
| *G06F 12/084* | (2016.01) |
| *G06F 12/0897* | (2016.01) |

(52) U.S. Cl.
CPC ...... *G06F 12/0804* (2013.01); *G06F 12/0842* (2013.01); *G06F 12/0868* (2013.01); *G06F 12/0871* (2013.01); *G06F 12/0873* (2013.01); *G06F 12/0877* (2013.01); *G06F 12/084* (2013.01); *G06F 12/0897* (2013.01); *G06F 2009/45583* (2013.01); *G06F 2212/1024* (2013.01); *G06F 2212/152* (2013.01); *G06F 2212/502* (2013.01)

(56) References Cited

U.S. PATENT DOCUMENTS

| | | |
|---|---|---|
| 8,739,159 B2 | 5/2014 | Lin |
| 8,745,618 B2 | 6/2014 | Lin |
| 8,819,687 B2 | 8/2014 | Chung |
| 9,336,147 B2 | 5/2016 | Kotla |
| 9,396,135 B2 | 7/2016 | Kavi |
| 9,507,731 B1 | 11/2016 | Zheng |
| 9,515,899 B2 | 12/2016 | Vemuri |
| 10,095,621 B1 | 10/2018 | Birke |
| 2003/0196040 A1 | 10/2003 | Hosogi |
| 2011/0239220 A1 | 9/2011 | Gibson |
| 2011/0246688 A1 | 10/2011 | Vaz |
| 2016/0019158 A1 | 1/2016 | Palacharla |
| 2016/0055082 A1 | 2/2016 | Kim |
| 2016/0055086 A1 | 2/2016 | Fan |
| 2016/0342514 A1 | 11/2016 | Wang |
| 2019/0018774 A1 | 1/2019 | Birke |

OTHER PUBLICATIONS

Cheng et al., "LAP: Loop-Block Aware Inclusion Properties for Energy-Efficient Asymmetric Last Level Caches", http://isca2016.eecs.umich.edu/wp-content/uploads/2016/07/2A-3.pdf, 49 pages, 2016.

Disclosed Anonymously, "Dynamic Cache Reservation for Virtual Machine Applications in Cloud", An IP.com Prior Art Database Technical Disclosure, IP.com No. IPCOM000233167D, IP.com Electronic Publication Date: Nov. 28, 2013, 7 pages.

Gundu et al., "Memory Bandwidth Reservation in the Cloud to Avoid Information Leakage in the Memory Controller", HASP'14, Jun. 15, 2014, Minneapolis, MN, 5 pages.

Hashemi et al., "Accelerating Dependent Cache Misses with an Enhanced Memory Controller", Jun. 21, 2016, The University of Texas at Austin, Electrical and Computer Engineering, Cockrell School of Engineering, 15 pages.

Intel, "Cache Monitoring Technology and Cache Allocation Technology", Accessed on Jun. 8, 2017, 4 pages.

Intel, "Intel® 64 and IA-32 Architectures Software Developer's Manual", vol. 3 (3A, 3B, 3C & 3D): System Programming Guide, Order No. 325384-060US, Sep. 2016, Section 17.16, "Intel® Resource Director Technology (Intel® RDT) Monitoring Features", pp. 17-42-17-43.

Kanev et al., "Profiling a warehouse-scale computer", ISCA'15, Jun. 13-17, 2015, Portland OR, 12 pages.

Kim et al., "Thread Cluster Memory Scheduling: Exploiting Differences in Memory Access Behavior", Carnegie Mellon University, MICRO-43, 2010, pp. 1-12.

List of IBM Patents and Patent Applications Treated as Related. Filed Apr. 22, 2019. 2 pages.

Lo et al., "Heracles: Improving Resource Efficiency at Scale", ISCA '15, Jun. 13-17, 2015, Portland, OR, USA, 13 pages.

Mell et al., The NIST Definition of Cloud Computing, National Institute of Standards and Technology, U.S. Department of Commerce, Special Publication 800-145, Sep. 2011, 7 pages.

Muralidhara et al., "Reducing Memory Interference in Multicore Systems via Application-Aware Memory Channel Partitioning", MICRO'11 Dec. 3-7 2011, Porto Alegre, Brazil, pp. 1-12.

Xen, "Intel Platform QoS Technologies", https://wiki.xenproject.org/wiki/Intel_Platform_QoS_Technologies, Accessed on Jun. 8, 2017, 5 pages.

Xenbits, "Intel Platform Shared Resource Monitoring/Control in xl", http://xenbits.xen.org/docs/unstable/misc/xl-psr.html, Accessed on Jun. 8, 2017, 4 pages.

FIG. 8 ions, according to the embodiment of FIG. 4;
COORDINATION OF CACHE AND MEMORY RESERVATION

BACKGROUND

The present invention generally relates to assignment of memory resources, and more particularly to a method for coordinating cache and memory reservation in a computerized system to ensure quality of service (QoS) by avoiding interferences of applications on cache, memory and/or memory controller.

A cache is used to speed up data transfer and may be either temporary or permanent. Memory caches are in every computer to speed up instruction execution and data retrieval and updating. These temporary caches serve as staging areas, and their contents are constantly changing. A memory cache, or "CPU cache," is a memory bank that bridges main memory and the central processing unit (CPU). A memory cache is faster than main memory and allows instructions to be executed and data to be read and written at higher speed. Instructions and data are transferred from main memory to the cache in fixed blocks, known as cache "lines."

SUMMARY

In one aspect, the present disclosure refers to a method for coordinating cache and memory reservation in a computerized system. The system includes a cache memory, a memory and a memory controller. A set of applications interacts with the memory through the cache memory and a plurality of memory channels. The method includes dynamically partitioning the cache memory and the memory channels in order to handle requests from said applications to said memory controller.

According to a further aspect, a computerized system including a cache memory, a memory and a memory controller is provided. The system is configured to enable a set of applications to interact with the memory through the cache memory and a plurality of memory channels, the system includes a control entity configured to dynamically partition the cache memory and the memory channels in order to handle requests from said applications to said memory controller.

According to a further aspect, a computer program product for coordinating cache and memory reservation in a computerized system is provided. The computer program product includes a computer readable storage medium having program instructions embodied therewith, the program instructions being executable by a processor to cause the processor to execute a method for coordinating cache and memory reservation as indicated above.

BRIEF DESCRIPTION OF THE DRAWINGS

The following detailed description, given by way of example and not intended to limit the invention solely thereto, will best be appreciated in conjunction with the accompanying drawings, in which.

The drawings are not necessarily to scale. The drawings are merely schematic representations, not intended to portray specific parameters of the invention. The drawings are intended to depict only typical embodiments of the invention. In the drawings, like numbering represents like elements.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

In the interest of not obscuring the presentation of embodiments of the present invention, in the following detailed description, some processing steps or operations that are known in the art may have been combined together for presentation and for illustration purposes and in some instances, may have not been described in detail. In other instances, some processing steps or operations that are known in the art may not be described at all. It should be understood that the following description is rather focused on the distinctive features or elements of various embodiments of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
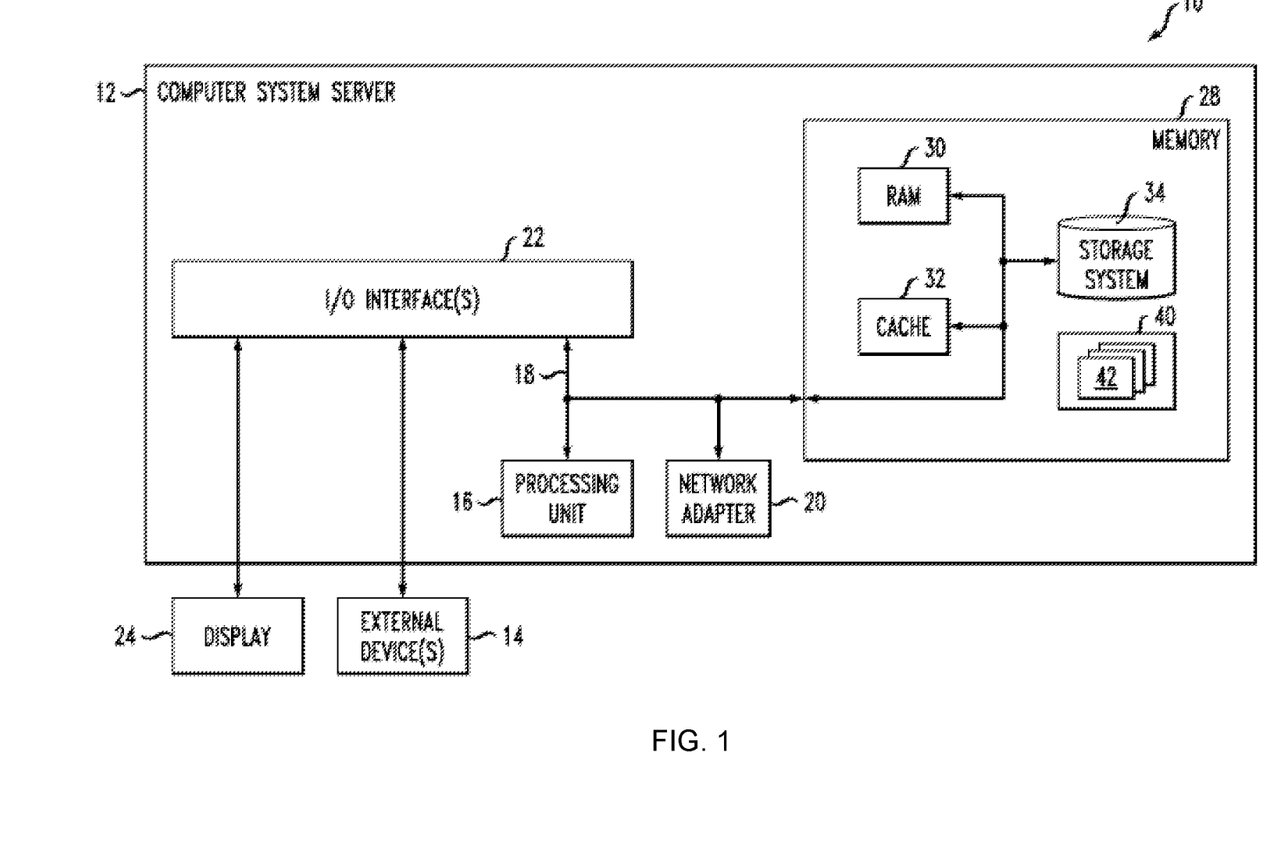
FIG. 1 depicts a cloud computing node, according to an embodiment of the present disclosure.

Referring now to FIG. 1, a diagram of an example of a cloud computing node is shown, according to an embodiment of the present disclosure. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
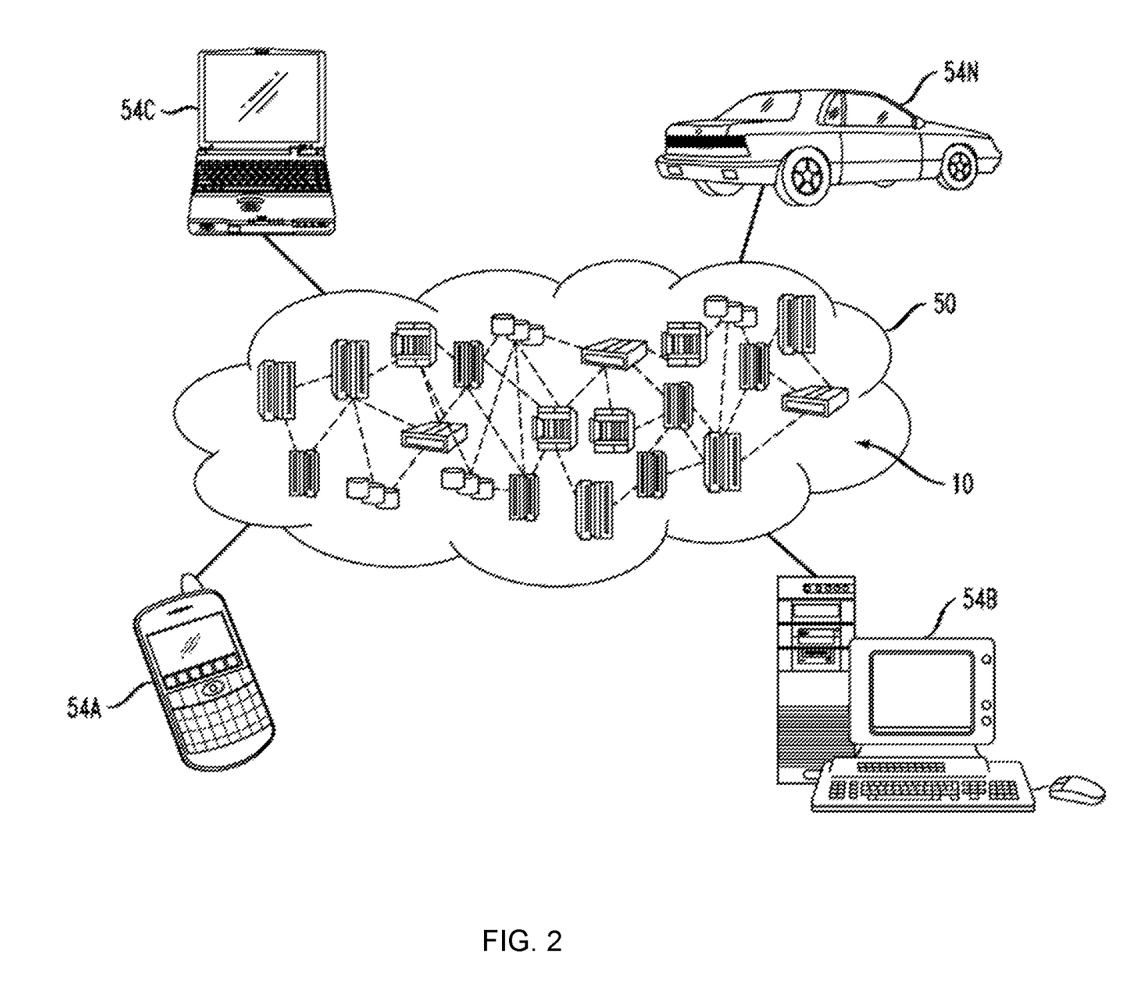
FIG. 2 illustrates a cloud computing environment, according to an embodiment of the present disclosure.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
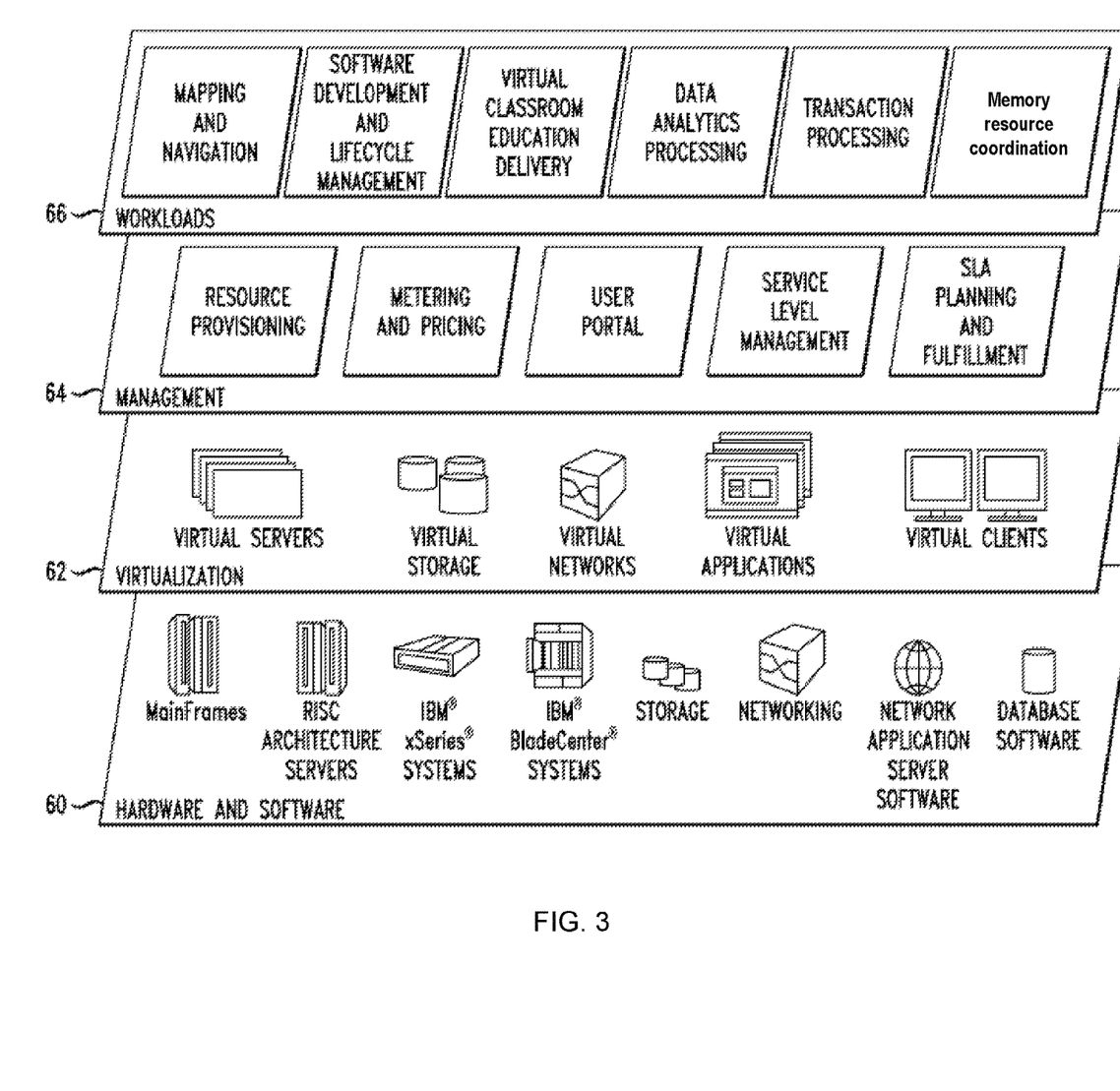
FIG. 3 illustrates abstraction model layers, according to an embodiment of the present disclosure.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and memory resource coordination.

Applications having a high demand for memory resources (e.g., in-memory analytics applications) are increasingly being hosted in cloud environments where such applications are executed by virtual machines (VMs). However, some of those applications are sensitive to interference on system resources, specifically cache, memory bandwidth, or both, meaning performance degrades when applications are co-located in the cloud.

Memory bandwidth may be limited because the memory controller or memory channels coupling the cache with memory (specifically RAM) form bottlenecks. Specifically, when applications are hosted in a cloud environment, such bottlenecks may occur because of contention of applications on cache space, memory bandwidth or both. So, sufficient cache space and memory bandwidth are key properties for such applications in order to guarantee quality of service (QoS).

Embodiments of the present invention relate to the field of computing, and more particularly to assignment of memory resources. The following described exemplary embodiments provide a system, method, and computer program product to, among other things, coordinate cache and memory reservation in a computerized system to ensure QoS by avoiding interferences of applications on cache, memory and/or memory controller. Therefore, the present embodiment has the capacity to improve the technical field of assignment of memory resources by introducing reservations to guarantee QoS for latency-critical applications.

The concept may include three levels of reservation which are based on current application usage. By appropriate coordination of such levels of reservation, improved performance for latency critical applications is achieved. The levels of reservation may include: memory channel partitioning, memory controller request scheduling (i.e. assigning different priorities to memory controller requests of applications) and cache partitioning, specifically last level cache (LLC) partitioning. The cache partitioning and memory controller request scheduling may be coordinated together, i.e. said LLC partitioning has direct influence on the memory controller request scheduling. For example, LLC partitioning has direct influence on the priorities assigned to the memory controller requests of the respective applications.

One embodiment by which reservations to guarantee QoS for latency-critical applications may be introduced is described in detailed below by referring to the accompanying drawings in FIGS. 4-8.

Figure 4:
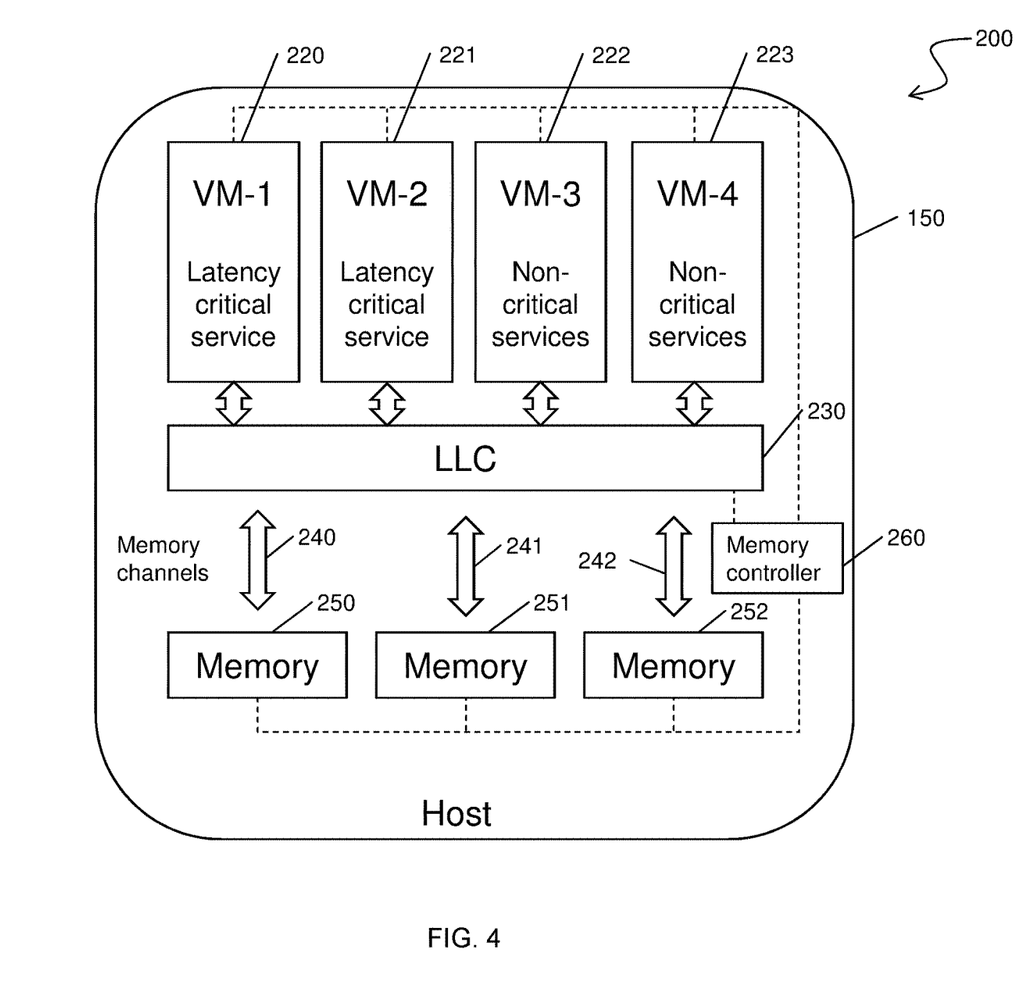
FIG. 4 illustrates the architecture of a computerized system based on a schematic diagram, according to an embodiment of the present disclosure.

Referring now to FIG. 4, a diagram depicting an example system architecture of a computerized system 200 is shown, according to an embodiment of the present disclosure. It should be noted that the following figures may only include system entities relevant for explaining the basic processes for mitigating contention of memory resources. Thus, the skilled person may understand that the computerized system 200 may include further entities not shown in the following figures because of their minor relevance for the following explanation of memory resource contention mitigation.

The system 200 comprises a host 210, on which multiple VMs 220, 221, 222, 223 are running on. However, the present invention should not be understood as only being applicable in virtualized computerized systems. The basic idea of the present invention may also be applicable on non-virtualized multi-processor environments where multiple different applications are using common memory resources (cache memory, memory channels, memory etc.).

In the present embodiment, on VMs 220, 221 (VM-1, VM-2) latency-critical services (applications) are running, whereas VMs 222, 223 (VM-3, VM-4) run non-critical services (applications). The VMs 220, 221, 222, 223 communicate with cache memory 230. The cache memory 230 may be LLC. In addition, multiple memory channels 240, 241, 242 are provided which enable the VMs 220, 221, 222, 223 to communicate with memory entities 250, 251, 252 (e.g. main memory entities). The system 200 may further include a memory controller 260 adapted to control memory access to the memory entities 250, 251, 252 based on memory requests provided from the VMs 220, 221, 222, 223 to the memory controller 260. In such system 200, different sources of contention may exist. On the one hand, LLC contention may occur, i.e. different applications use the same cache section thereby causing cache interference. Such applications may be referred to as "cache-bound", i.e. cache is limiting the application's performance. On the other hand, memory bandwidth available for the respective application may be a limiting factor. Memory bandwidth may be limited because of memory channel contention or memory controller contention. Such applications may be referred to as "bandwidth-bound", i.e. memory bandwidth is limiting the application's performance.

Figure 5:
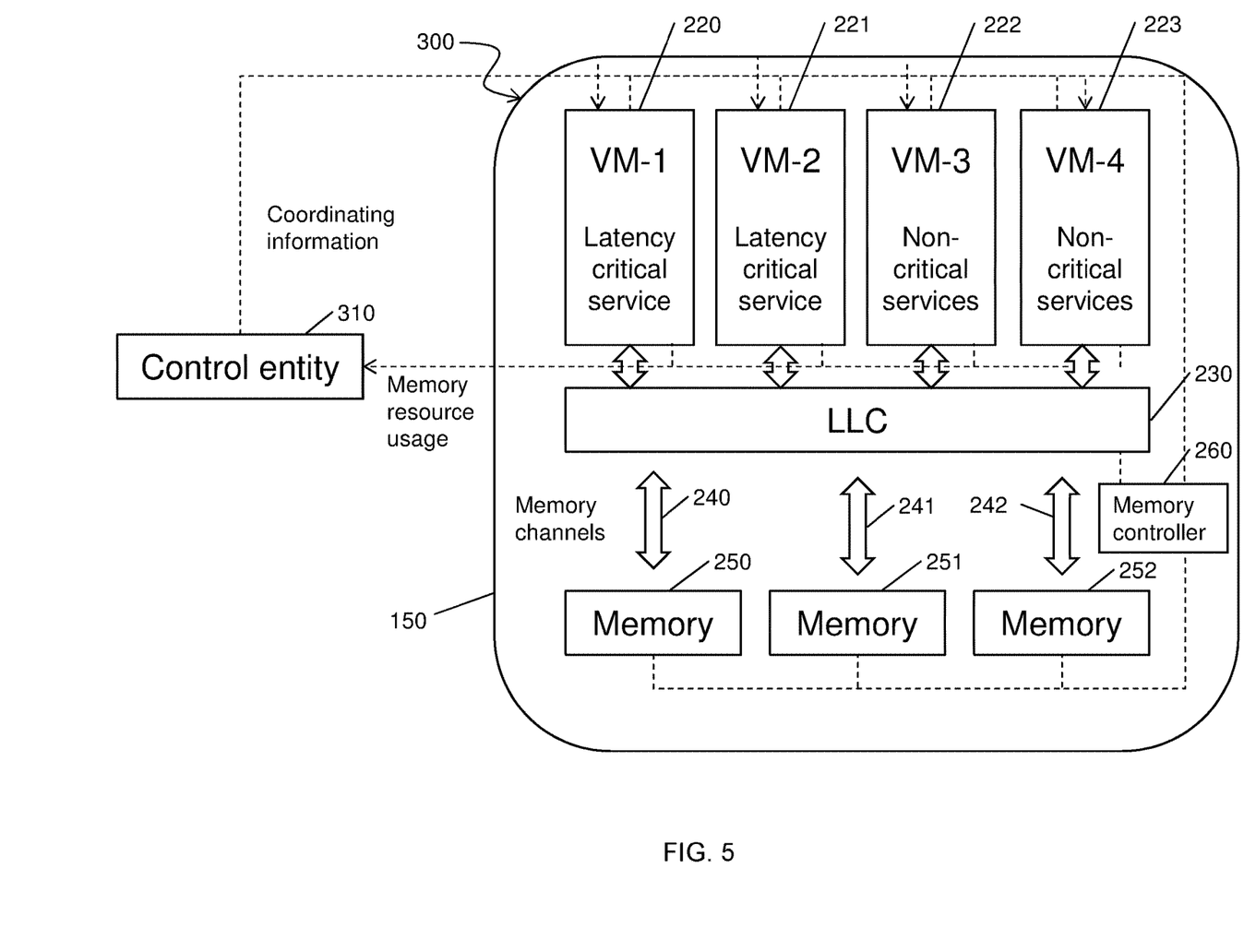
FIG. 5 illustrates a control cycle included in a computerized system, according to the embodiment of FIG. 4.

Referring now to FIG. 5, a diagram depicting an extension of the computerized system 300 (FIG. 4) is shown, according to an embodiment of the present disclosure. It should be noted that all features described before in conjunction with FIG. 4 are applicable to the computerized system 200 described below, unless indicated otherwise. The system 300 may include a control entity 310 for coordinating processes for reducing application interferences leading to a degradation of QoS. The control entity 310 may be implemented in hardware or software. In addition, the control entity 310 may include two or more control entity portions where a first part of control entity portions is hardware-implemented, and a second part of control entity portions is software-implemented. Based on the control entity 310, a contention mitigating control cycle is implemented in order to reduce contention of different applications on system resources, specifically memory resources. The control entity 310 may receive resource usage information, specifically memory resource usage information from the VMs or applications and provide coordinating information to the system 300 such that the memory resources can be used by the respective applications with reduced risk of contention.

More specifically, the control entity 310 may receive information regarding cache misses (i.e. requests for data which are currently not included in the cache, respectively, unsuccessful cache references), cache access rate (i.e. cache accesses per time unit) and/or memory bandwidth usage of a certain application/VM. Based on said information it is possible for the control entity 310 to determine the current memory requirements of the respective application/VM and orchestrate the usage of memory resources of all applications/VMs depending on the current memory requirements in order to reduce application interferences due to memory resource bottlenecks.

Based on the received resource usage information, the control entity 310 is able to establish coordinating information which controls the usage of memory resources by the respective applications/VMs. By coordinating the information, the control entity 310 may control cache partitioning for the respective applications/VMs, define the size of cache partitions, define priorities for memory requests of the respective applications/VMs addressed to the memory controller 260 and control memory channel partitioning/grouping for the respective applications/VMs. The control entity may receive memory resource usage information in a continuous or intermittent way and may provide coordinating information to the system 300 in a continuous or intermittent way in order to change the usage of memory resources by the applications/VMs depending on the current application requirements, as will be described in detail below. In other words, the coordination of information by the control entity 310 may be time-variant information in order to adapt the memory resources reservations to the current application demands.

Figure 6:
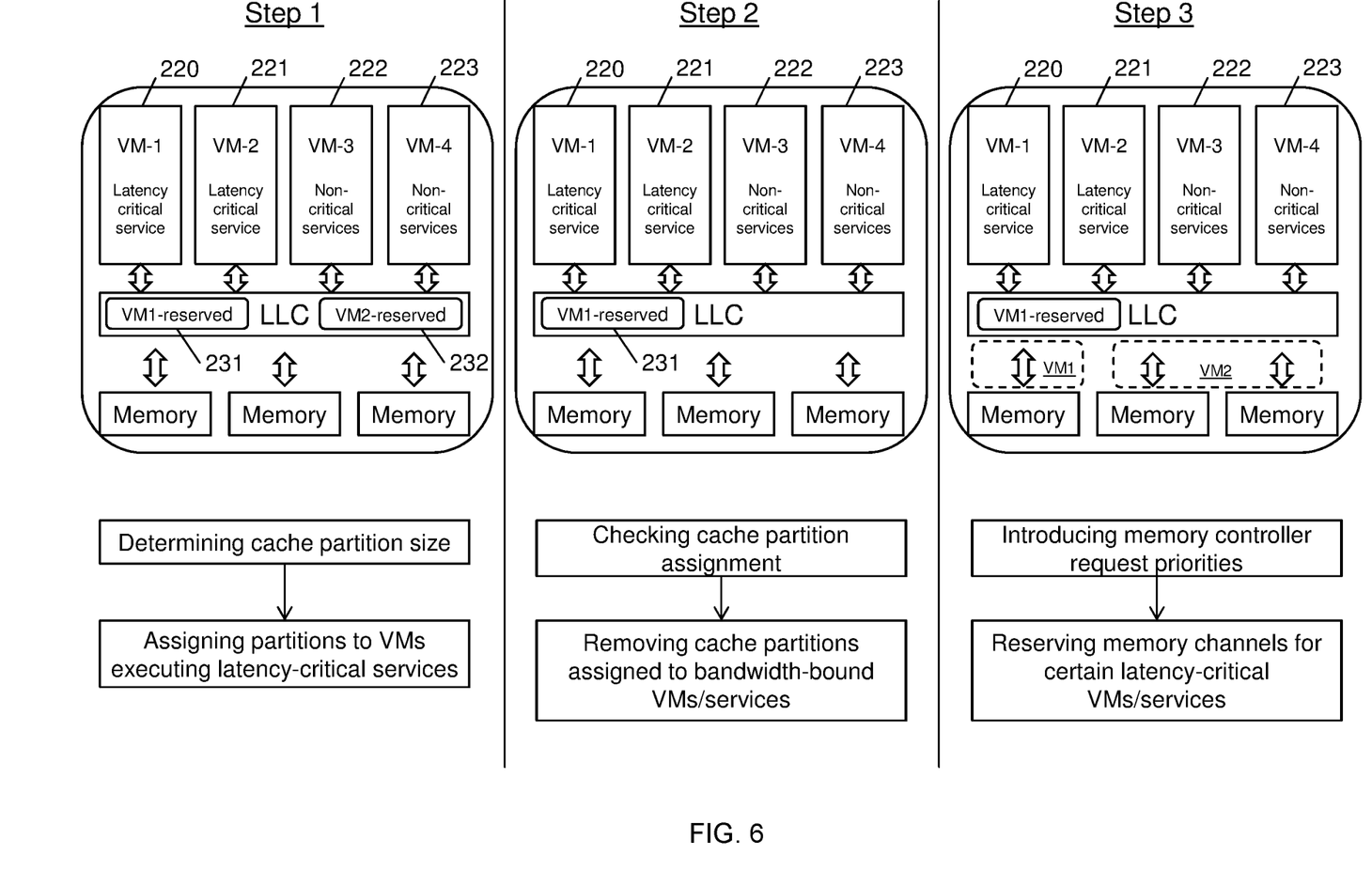
FIG. 6 illustrates multiple steps for distributing memory resources across multiple VMs handling latency-critical services, according to an embodiment of the present disclosure.

Referring now to FIG. 6, a diagram depicting the steps performed within the control loop are shown, according to an embodiment of the present disclosure. First, applications/VMs are classified as being memory-resource sensitive (also referred to as "latency-critical") or not memory-resource sensitive. In the present example, VMs 220, 221 run memory-resource sensitive services, which performance is significantly decreased in case of memory resource contention. The applications running on VMs 222, 223 are not memory-resource sensitive. In step 1 cache is partitioned into cache partitions 231, 232, where a first cache partition 231 is exclusively reserved for VM 220 and a second cache partition 232 is exclusively reserved for VM 221. It should be noted that, in one embodiment, cache partitions 231, 232 are only provided to applications/VMs being classified as memory-resource sensitive. So, no cache partitions 231, 232 are reserved for VMs 222, 223. The size of the cache partitions 231, 232 may be chosen depending on information regarding resource usage, specifically, depending on the cache access rate of the respective application. More specifically, the higher the cache access rate of the respective application the bigger the size of its cache partition 231, 232.

After partitioning the cache memory 230, the benefit of cache partitioning for the respective application/VM is checked. More specifically, it may be evaluated if the number of cache misses of a certain application/VM decreased because of assigning a cache partition to such application/VM. According to embodiments, it may be evaluated if due to cache partitioning, the cache misses decreased (compared to the situation without cache partitioning) by a certain amount. For example, a threshold value may be defined which is used to determine whether said cache partitioning seems to be reasonable. If the delta of cache misses before cache partitioning and cache misses after cache partitioning is above the threshold value, the application (which is running on VM 220, 221) may be classified as cache-bound, i.e. cache usage before cache partitioning was a limiting factor. Otherwise (i.e. delta of cache misses before cache partitioning and after cache partitioning is below said threshold), the application may be classified as bandwidth-bound, i.e. memory bandwidth is deemed to be the limiting factor.

With continued reference to FIG. 6, in step 2 the cache partition 231 associated with VM 220 (respectively, the application running on VM 220) is retained because of the proved performance gain (significant reduction of cache misses). However, cache partition 232 is removed because of lack of significant performance gain due to assigning a cache partition to VM 221 (respectively, the application running on VM 221). So, in other words, after initializing cache partitions, the cache partitioning is reviewed, and cache partitions are maintained for cache-bound applications/VMs and discarded for bandwidth-bound applications/VMs.

In step 3, reservations for memory channels 240, 241, 242 and prioritizations of memory controller requests are introduced. The prioritization may include a memory controller request schedule priority, i.e. the scheduling of memory controller requests is performed based on priorities. Such priorities may be assigned to the applications/VMs depending on the classification if an application/VM is cache-bound, bandwidth-bound or neither of them. Preferably, the highest priority level is assigned to applications/VMs being classified as bandwidth-bound. Thus, applications/VMs with a high memory bandwidth demand are privileged compared to other applications. A medium priority level may be assigned to applications/VMs being classified as cache-bound. The cache-bound applications/VMs may be less prioritized than bandwidth-bound applications/VMs because it is assumed that they will have a lower memory access rate because they benefit more from cache. The lowest priority level may be assigned to applications/VMs corresponding to services which are not critical in the sense of latency. Based on the priority scheme, requests addressed to the memory controller may be scheduled in order to privilege bandwidth-intensive applications/VMs.

In addition, latency critical applications/VMs may be distributed across different memory channels 240, 241, 242. So, in other words, also reservations for certain memory channels 240, 241, 242 may be introduced in order to enable latency critical applications/VMs an improved access to the memory. In a first step, an attempt is being made that a certain memory channel 240, 241, 242 is assigned to each latency critical application/VM (cache-bound and bandwidth-bound). In the present example, three memory channels 240, 241, 242 are available for two latency critical applications/VMs. VM 221 is deemed to be bandwidth-bound, i.e. it is assumed that it will have a higher memory bandwidth demand. Therefore, a higher number of memory channels may be reserved for VM 221 compared to VM 220. In case that the number of available memory channels 240, 241, 242 is lower than the number of latency critical applications/VMs, multiple latency critical applications/VMs have to use a certain memory channel. So, in other words, two or more latency critical applications/VMs are bound to one and the same memory channel. In order to further enhance the distribution of memory resources, a cache-bound and a bandwidth-bound application/VM may be grouped to the same memory channel. As mentioned above, it may be assumed that a bandwidth-bound application/VM may have a higher memory bandwidth demand than a cache-bound application/VM. By grouping cache-bound and bandwidth-bound applications/VMs together on a certain memory channel it may be avoided that multiple bandwidth-bound applications/VM are tied to a certain memory channel thereby causing a bottleneck at said memory channel. As such, in case that the number of available memory channels 240, 241, 242 exceed the number of latency-critical applications/VMs, it is attempted to avoid a grouping of two or more bandwidth-bound applications/VMs to one and the same memory channel, respectively, it is attempted to obtain a mixed grouping of bandwidth-bound and cache-bound applications/VMs at a certain memory channel in a combination such that the aggregate bandwidth usage is the lowest.

Figure 7:
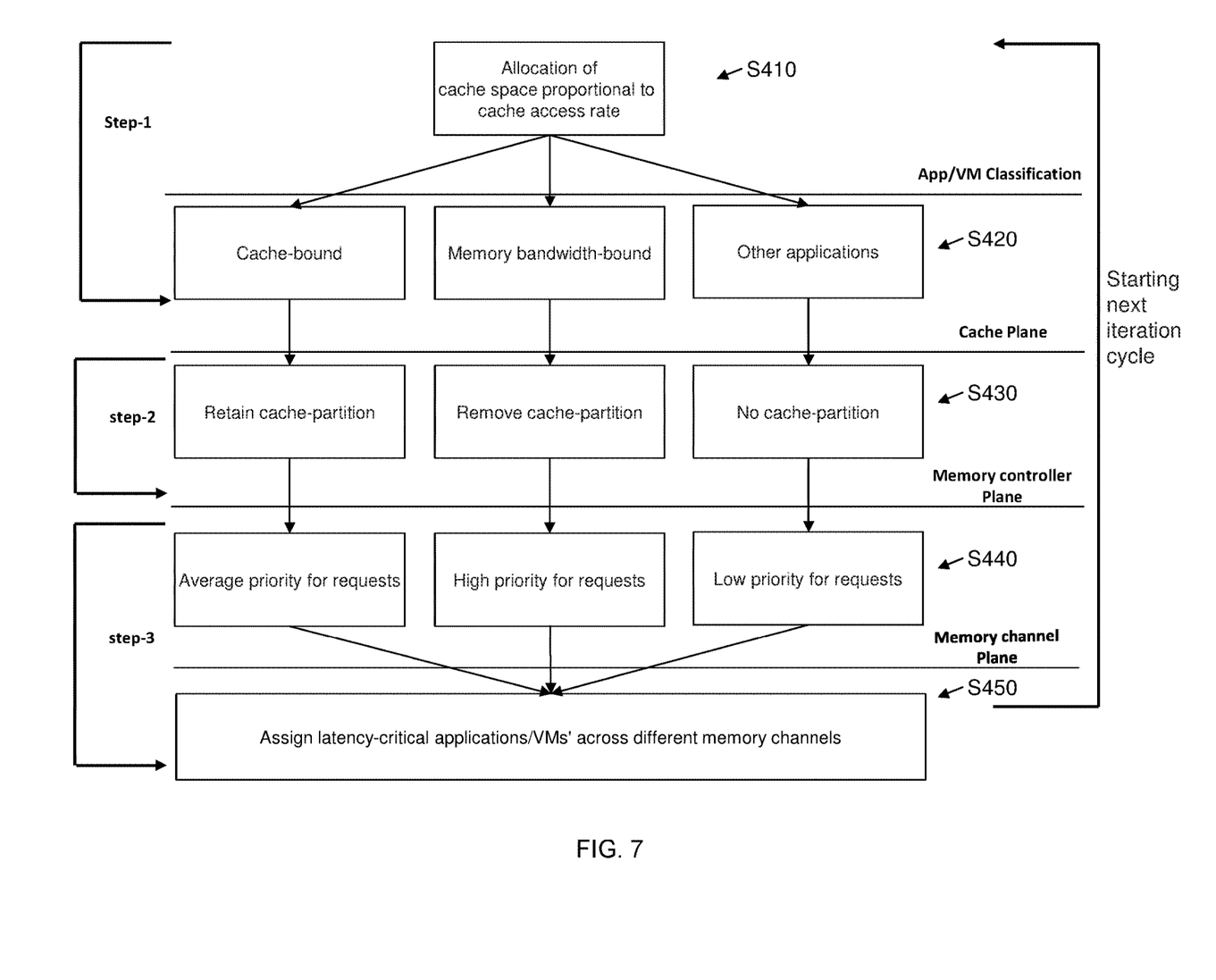
FIG. 7 illustrates a flow chart with multiple steps performed during an iterative control cycle routine, according to an embodiment of the present disclosure.

Referring now to FIG. 7, a diagram depicting the dynamic allocation/reservation of memory resources is shown, according to an embodiment of the present disclosure. Based on an iterative passing of the control cycle, the memory resources are dynamically distributed to the latency-critical applications/VMs thereby considering a dynamic, time-variant memory resource usage of the applications/VMs. In a first step, cache space is allocated for the respective applications/VMs. The cache space may be allocated dependent, specifically proportional to their cache access rate (S410). In the following, a cache partition is assigned to the respective applications/VMs (i.e. only for latency-critical applications/VMs). The assignment may be an exclusive reservation of cache space for the respective application/VM. As already mentioned before, depending on the change of cache misses due to the introduction of cache partitions, the respective latency-critical application/VM is classified as being cache-bound or bandwidth-bound (S420).

Subsequently, based on the classification of a latency-critical application/VM as being cache-bound or bandwidth-bound it is decided whether to retain or discard the cache partition for the respective latency-critical application/VM. The cache partitions may be maintained for the cache-bound applications/VMs and may be removed for the bandwidth-bound applications/VMs (S430). In the following step (S440), memory control request scheduling is introduced based on a priority regime. As mentioned above, different priorities based on which memory control requests are processed are assigned based on the classification of the applications/VMs as being cache-bound, bandwidth-bound or none. The highest priority level may be assigned to bandwidth-bound applications/VMs, a medium priority level may be provided to cache-bound applications/VMs and the lowest priority level may be provided to applications/VMs which are not latency-critical. Finally, latency-critical applications/VMs may be distributed across different memory channels in order to avoid bottlenecks at the memory channels (S450). As previously described, the distribution may be performed such that a memory access of multiple bandwidth-bound applications/VMs via a single memory channel is avoided even in cases when the number of latency-critical applications/VMs exceeds the number of available memory channels.

The previously described steps of forming a memory resource control cycle may be performed iteratively. The cycle may be steadily run through or iterated after termination of a certain time span, e.g. every n seconds, where n is a natural number. As such, the distribution of the memory resources may be dynamically adapted to the current requirements of latency-critical applications/VMs in order to guarantee a certain level of quality of service.

Figure 8:
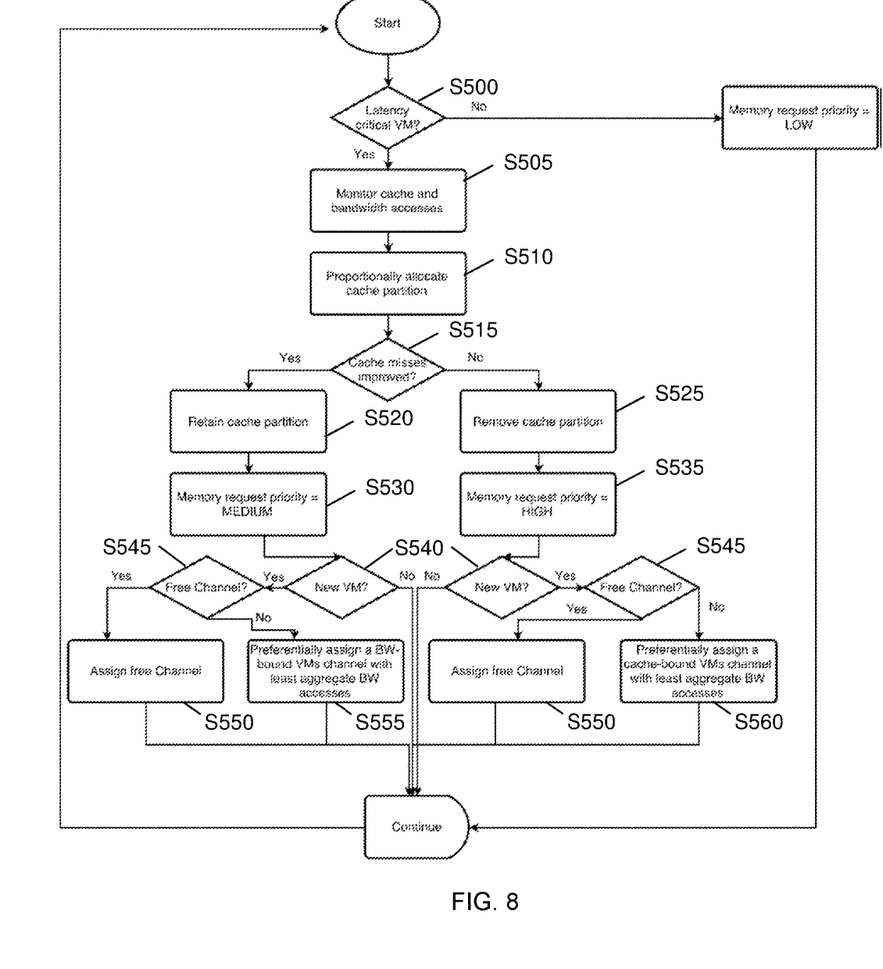
FIG. 8 illustrates a detailed flow chart of an iterative control cycle routine, according to an embodiment of the present disclosure.

Referring now to FIG. 8, a flowchart illustrating one cycle of the memory resource control routine is shown, according to an embodiment of the present disclosure. After starting the cycle, it is checked whether the service of the application/VM is latency-critical or not (S500). In case of a non-latency-critical service, the application/VM is marked with a low memory request priority (priority for handling memory requests) and the current cycle ends for said application/VM. In case of a latency-critical application/VM, the current cache access rate and the required memory bandwidth are monitored (S505). Based on information regarding the cache access rate and/or the required memory bandwidth, a cache partition is allocated, the size of the cache partition may correspond to the investigated cache access rate and/or the required memory bandwidth (S510).

After assigning cache partitions to latency-critical applications/VMs, it is investigated whether the number of cache misses per time unit has been reduced or not (S515). As mentioned above, a threshold value may be defined in order to decide whether the improvement induced by the cache partitioning is significant. If the reduction of cache misses is above the defined threshold, the cache partition is retained (S520) because the application/VM is deemed to be cache-bound. Otherwise, the cache partition is removed (S525) because the application/VM is deemed to be bandwidth-bound.

Depending on retaining/removing the cache partition, the priority of scheduling memory requests is determined. In case of a cache-bound application/VM, the priority level is set to medium (S530), in case of a bandwidth-bound application/VM, the priority level is set to high (S535). After assignment of priorities, it is determined whether the application/VM is a new one or the application/VM has already been monitored in at least one previous cycle (S540). If the application/VM has already been monitored before, a memory-memory channel assignment has already been performed and the current cycle ends for such application/VM. In case of a new application/VM, it is checked whether a free memory channel is available (S545). If so, a free memory channel is assigned to said application/VM in order to avoid memory channel contention (S550). If no free memory channels are available, in case of a cache-bound application/VM, memory accesses of a cache-bound application/VM are preferably handled via a memory channel in which memory accesses of another bandwidth-bound application/VM are transmitted (S555). On the other hand, memory accesses of a bandwidth-bound application/VM are preferably handled via a memory channel in which memory accesses of another cache-bound application/VM are transmitted (S560). Thus, preferably a bandwidth-bound application/VM and a cache-bound application are grouped together at a certain memory channel in order to reduce the risk of memory channel contention.

Therefore, by coordinating cache and memory reservation, available system resources, specifically available memory resources are used in a more effective manner thereby avoiding performance degrades in applications sensitive to interference on memory resources.

Stated differently, as the number of in-memory analytics applications hosted in cloud environments increases, sufficient cache space and memory bandwidth may be delivered by coordinating cache and memory reservation which prevents meaning performance of applications sensitive to interference on cache, memory bandwidth, or both, to be degraded as such applications are co-located in the cloud, thereby providing satisfactory QoS.

According to embodiments of the present disclosure, information regarding resource usage of applications may be gathered and the dynamic partitioning of cache memory and/or memory channels may be performed based on the resource usage information. Thereby, the distribution of system resources, specifically of memory resources may be performed based on current resource usage of applications.

The information regarding resource usage may include cache misses, cache access rate and/or memory bandwidth usage of a certain application. Based on said information, resource usage of a certain application may be investigated in closer detail and the distribution of system resources among multiple applications may be controlled according to the specific resource usage.

The cache memory may be dynamically partitioned based on information regarding cache misses and information regarding cache access rate. For example, based on information regarding the cache access rate of a certain application, the size of a cache memory partition may be determined. Information regarding cache misses, specifically information regarding cache misses before and after cache partitioning may be used to determine whether a certain cache partition should be maintained for a certain application or not.

The partition size of a cache memory partition associated with a certain application is dynamically adapted based on information regarding resource usage, specifically based on the cache access rate of said application. Thereby, the size of cache reserved for a certain application may be adapted according to the current cache usage.

Applications running on the computerized system are classified as being memory-resource sensitive or not memory-resource sensitive. The wording "memory-resource sensitive application" may generally be understood as an application which shows significant degradation of performance in case of limited memory resources. "Memory-resource sensitive application" may also be referred to as "latency-critical application" or "latency-critical service".

A memory-resource sensitive application is classified as being cache-bound or as being memory bandwidth-bound. By means of said classification, different kinds of applications may be distinguished, namely a first kind of applications which are limited due to a bottleneck of cache space and a second kind of applications which are limited due to a bottleneck of memory bandwidth. The resource distribution may be performed based on said classification information.

The classification (cache-bound or bandwidth-bound) may be established based on a comparison of information indicating cache misses of a certain application before cache memory partitioning and information indicating cache misses of a certain application after cache memory partitioning. In case that cache misses are significantly reduced (e.g. at least by a certain threshold value) due to cache memory partitioning, it may be concluded that introducing cache memory partitioning shows a significant improvement in cache memory usage. Thus, the application seems to have been limited due to a bottleneck of cache space (cache-bound). Otherwise, the application is deemed to be limited due to a bottleneck of memory bandwidth (bandwidth-bound).

An application classified as being cache-bound is associated with a certain cache memory partition and a cache memory partition assigned to an application classified as being bandwidth-bound is discarded. Bandwidth-bound applications may not show a significantly improved performance due to introducing cache memory partitioning because the memory bandwidth forms a performance bottleneck which could not be addressed by cache memory partitioning. As such, a cache memory partition assigned to an application classified as being bandwidth-bound may be removed.

The classification of a memory-resource sensitive application as being cache-bound or bandwidth-bound is dynamically reviewed based on information indicating current cache misses of a certain application. More in detail, the number of cache misses may be monitored in certain intervals in order to decide whether the classification of a memory-resource sensitive application as being cache-bound or bandwidth-bound can uphold or has to be changed. Thereby a dynamic adaption to application requirements may be obtained.

Memory requests provided to the memory controller are prioritized based on the classification of the application as being cache-bound or bandwidth-bound. The classification information may also be indicative for an improved scheduling of controller requests provided to the memory controller. Thus, a prioritization regime may be obtained based on said classification information.

Memory requests of an application being classified as bandwidth-bound are higher prioritized than memory requests of an application being classified as cache-bound. Thereby, the bottleneck due to delayed handling of memory bandwidth intensive applications may be mitigated.

Memory accesses performed by multiple memory-resource sensitive applications are split across different memory channels. Thereby contention of applications due to joint usage of a single memory channel may be reduced.

At least one cache-bound and at least one bandwidth-bound application are associated with a certain memory channel if the number of applications identified as memory-resource sensitive exceed the number of available memory channels. Thereby, memory channel contention may be reduced by bounding memory bandwidth-intensive applications and cache-intensive applications together on a certain memory channel.

Memory resources are assigned to the respective applications based on memory resource usage of the respective application by dynamically assigning cache memory partitions to the respective applications, dynamically assigning memory channel partitions to the respective applications and dynamically assigning priorities to the requests of applications provided to the memory controller. Due to said three levels of reservations/assignments, the quality of service (QoS) of latency-sensitive applications could be guaranteed without unfairly impacting the overall system throughput.

Therefore, dynamically partitioning the cache memory and memory channels may be performed iteratively based on consecutive resource usage refinement loops/cycles. Each resource usage refinement loop comprises the steps of: proportionally allocating cache memory space for said memory-resource sensitive applications based on cache access rate of the respective application; classifying the respective application as cache-bound or bandwidth-bound; removing or retaining the cache memory partition of the respective application depending on the applications classification; assigning priorities to the requests of applications provided to the memory controller based on the applications classification; and distributing at least the memory accesses of bandwidth-bound applications across different memory channels.

In this manner the distribution of the system resources may be dynamically adapted to the current requirements of memory-resource sensitive, respectively latency sensitive applications.

In some embodiments, the applications are distributed across different virtual machines of a virtualized computerized system. Thus, system resources provided in a cloud environment and providing computational resources for multiple memory-resource sensitive, respectively latency sensitive applications can be distributed such that the applications may fulfill certain QoS-guarantees.

The descriptions of the various embodiments of the present invention have been presented for purposes of illustration but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer system for coordinating cache and memory reservation in a computerized system comprising a cache memory, a memory and a memory controller, the computer system comprising:
one or more processors, one or more computer-readable memories, one or more computer-readable tangible storage devices, and program instructions stored on at least one of the one or more storage devices for execution by at least one of the one or more processors via at least one of the one or more memories, wherein the computer system is capable of performing a method comprising:
detecting a first plurality of virtual machines and a second plurality of virtual machines in the computerized system, wherein the first plurality of virtual machines and the second plurality of virtual machines communicate with the memory through the cache memory and a plurality of memory channels, wherein the first plurality of virtual machines runs latency-critical services, and the second plurality of virtual machines runs non-critical services;

based on the second plurality of virtual machines running the non-critical services, assigning a low memory request priority;

based on the first plurality of virtual machines running the latency-critical services, determining a current cache access rate and a required memory bandwidth of the first plurality of virtual machines;

based on the determined current cache access rate and the required memory bandwidth, proportionally allocating a cache partition to the first plurality of virtual machines, wherein a size of the cache partition corresponds to the determined cache access rate and the required memory bandwidth;

defining a threshold value comprising a number of cache misses per time unit, wherein the threshold value helps determining whether an improvement caused by the cache partitioning is significant;

based on the number of cache misses per time unit being above the threshold value, identifying one or more virtual machines in the first plurality of virtual machines as cache-bound and retaining the cache partition;

receiving a memory request;

based on the one or more virtual machines in the first plurality of virtual machines being identified as cache-bound, assigning a medium priority for scheduling the memory request;

based on the number of cache misses per time unit being below the threshold value, identifying one or more virtual machines in the first plurality of virtual machines as bandwidth-bound and removing the cache partition;

based on the one or more virtual machines in the first plurality of virtual machines being identified as bandwidth-bound, assigning a high priority for scheduling the memory request, wherein a bandwidth-bound virtual machine comprises a higher memory bandwidth demand than a cache-bound virtual machine;

determining whether free memory channels are available;

based on determining that a number of free memory channels is less than the first plurality of virtual machines, assigning at least one cache-bound virtual machine and at least one bandwidth bound virtual machine to the same memory channel; and based on determining that the number of free memory channels exceeds the first plurality of virtual machines, preventing two or more bandwidth-bound virtual machines from being assigned to the same memory channel, and assigning a mixed grouping of bandwidth-bound virtual machines and cache-bound virtual machines to the same memory channel such that an aggregate bandwidth usage of the mixed grouping is the lowest.

* * * * *